United States Patent [19]

Aldridge

[11] 3,843,653

[45] Oct. 22, 1974

[54] 5,6,12,13-DI-ISOQUINO-(4,3-B:4',3'-E)-PYRAZINE-5,12-DIONES

[75] Inventor: Gerald Richard Aldridge, Elizabeth, N.J.

[73] Assignee: E. I. du Pont de Nemours and Company, Wilmington, Del.

[22] Filed: Nov. 6, 1972

[21] Appl. No.: 303,875

[52] U.S. Cl. .................. 260/250 BN, 260/250 R
[51] Int. Cl. .......................................... C07d 51/62
[58] Field of Search ........................... 260/250 BN Primary Examiner—Joseph A. Narcavage

[57] ABSTRACT

There is prepared the yellow compound 5,6,12,13-tetrahydrodiisoquino-(4,3-b:4',3'-e)pyrazine-5,12-dione by reaction of diindeno-(1,2-b:1',2'-e)pyrazine-6,12-dione either (a) with sodium azide in concentrated $H_2SO_4$ or (b) with hydroxylamine to yield a dioxime which is then rearranged in polyphosphoric acid. Chlorine-containing derivatives may also be prepared. The compounds may be used as pigments.

2 Claims, No Drawings

5,6,12,13-DI-ISOQUINO-(4,3-B:4',3'-E)-PYRAZINE-5,12-DIONES

BACKGROUND OF THE INVENTION

There is an increasing demand for new classes of yellow pigments, in particular ones which are characterized by a brilliant color and a low solubility in organic liquids. Relatively few organic compounds have been available which would meet these criteria, and at the same time not be excessively expensive to prepare.

SUMMARY OF THE INVENTION

The present invention relates to the production of compounds of the formula:

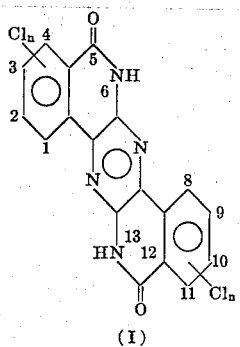

(I)

wherein each $n$ is an integer of 0 to 4, inclusive. In the case where each $n$ is zero, the compound (I) is 5,6,12,13-tetrahydrodiisoquino-(4,3-b:4',3'-e)pyrazine-5,12-dione.

The compound of formula (I) wherein each $n$ is zero may readily be obtained by reaction of diindeno-(1,2-b:1',2'-e)pyrazine-6,12-dione, compound (II), in concentrated sulfuric acid at 0° to 100°C. with sodium azide as follows:

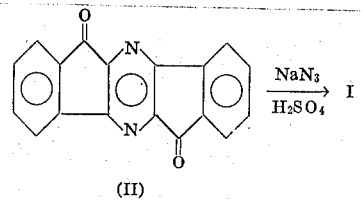

(II)

Alternatively the dioxime (III) of compound (II) is obtained by reaction with hydroxylamine in a tertiary organic amine, e.g., pyridine, at reflux, followed by rearrangement of the dioxime in polyphosphoric acid at a temperature of at least 170°C. This reaction is as follows:

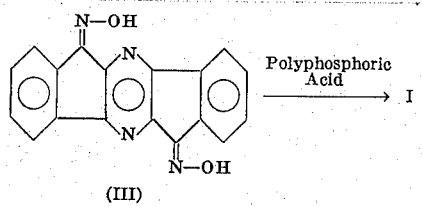

(III)

The chlorine-containing derivatives of the formula (I) may be obtained by directly chlorinating the compound wherein each $n$ is zero or by chlorinating compound (II) followed by effecting the reaction with sodium azide in the manner previously indicated.

The compounds of the invention are particularly useful as yellow pigments for coatings, printing inks, plastics and the like. In this respect they are characterized by a low degree of solubility in common organic liquids.

The following examples will show the preparation of the compounds of this invention and their use. Unless otherwise stated all parts and proportions therein are on a weight basis.

EXAMPLE 1

To a solution of 8.5 parts of diindeno-(1,2-b: 1',2'-e)pyrazine-6,12-dione (*Chemical Abstracts*, 51-12106 (1957)) in 300 parts of 96 percent sulfuric acid is added 4.3 parts of sodium azide, the addition being made over a period of 50 minutes. During this addition the temperature of the reaction mixture rises from 28° to 49°C. After the addition is complete, the reaction mixture is heated at 40°–50°C. for 2 hours, cooled, drowned in ice-water, stirred, filtered, washed acid free, and dried. A brown product is obtained which is then purified by recrystallization twice from concentrated sulfuric acid.

A bright yellow product is obtained which remains unmelted at temperatures up to 400°C. In dimethylformamide it exhibits a strong, blue fluorescence. Chemical analysis of the twice acid-recrystallized product shows the following:

| | For $C_{18}H_{10}N_4O_2$ | |
|---|---|---|
| | Found | Calculated |
| C | 68.12 | 68.8 |
| H | 3.01 | 3.18 |
| N | 17.39 | 17.8 |

Spectrographic analysis, by NMR and infrared techniques, indicate the product has the formula (I) wherein each n is zero.

EXAMPLE 2

A mixture of 192 parts anhydrous $AlCl_3$, 24 parts NaCl, and 3 parts NaF is heated to 110°–115°C. to obtain a melt. The melt is cooled to 90° and addition is made of 6.3 parts of the acid-recrystallized yellow compound prepared in Example 1. The mixture is stirred for 10 minutes after which chlorine is passed into the melt for 6 hours while the temperature is maintained at 110°–120°C. At the conclusion of this time, the mixture is drowned in a large volume of ice-water containing 230 cc. of 5 N HCl, and stirred. A yellow precipitate forms which is recovered by filtration, washed free of chloride ion, and dried. It is then purified by recrystallization from concentrated sulfuric acid.

The product is bright yellow and remains unmelted at temperatures up to 360°C. In dimethylformamide solution, this product exhibits a green fluorescence. Chemical analysis shows the following:

| | For $C_{18}H_2Cl_8N_4O_2$ | |
|---|---|---|
| | Found | Calculated |
| C | 36.77 | 36.6 |
| H | 0.61 | 0.3 |
| N | 9.77; 9.73 | 9.5 |
| Cl | 44.82; 44.90 | 48.1 |

It is concluded that the compound corresponds to that of formula (I) containing between 7 and 8 chlorines per molecule.

EXAMPLE 3

To a suspension of 14.2 parts of diindeno-(1,2-b: 1',2',-e)pyrazine-6,12-dione in 280 parts of pyridine is added 13.7 parts of hydroxylamine hydrochloride. The reaction mixture is boiled 6 hours, cooled, filtered washed with alcohol and then with water until free of chloride ion and dried. The product is purified by extraction with hot dimethylformamide. The purified dioxime product so obtained melts with decomposition around 340°–360°C.

Six and two-tenths parts of the dioxime so obtained are heated in 250 parts of polyphosphoric acid and the temperature maintained at 170°–180°C. for 1 hour. The mixture is then cooled to 150°C., drowned in ice and water, stirred, filtered, washed with water, dried and twice recrystallized from concentrated sulfuric acid.

The infrared spectrum of the bright yellow product is essentially identical with that of the product of Example 1.

EXAMPLE 4

A mixture of 288 parts anhydrous $AlCl_3$, 50 parts NaCl and 22.5 parts KCl is heated to 133° to obtain a melt. The melt is cooled to 110°–120° and 15.5 parts of diindeno-(1,2-b:1',2'-e)pyrazine-6,12-dione is added. The mixture is stirred for 10 minutes after which chlorine is passed into the melt for 5.5 hours while the temperature is maintained at 110°–120°C. At the conclusion of this time, the mixture is drowned in ice-water. The product is filtered off, washed chloride-ion free, and acid-free, and dried.

Analysis is as follows:
For $C_{18}H_4Cl_4N_2O_2$:
Found: Cl, 34.05;   Required: Cl, 33.6.

The strong peak at 1730 cm$^{-1}$ in the infrared spectrum of this compound is characteristic of a carbonyl group in a five-membered ring.

The reaction for the above preparation is thus concluded to be:

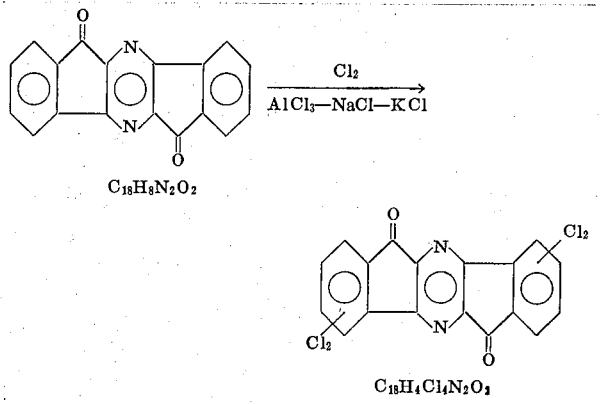

A solution is prepared of 8.4 parts of the tetrachlorodiindeno-(1,2-b:1',2'-e)pyrazine-6,12-dione so obtained in 300 parts of 96 percent sulfuric acid. Then 1.95 parts of sodium azide is added over a period of five minutes. During this addition the temperature of the reaction mixture rises from 27° to 34°C. After the addition is complete, the reaction mixture is heated at 40°–50°C. for 1 hour, an additional 1.95 parts of sodium azide is added, the reaction mixture is heated at 40°–50°C. for an additional hour, cooled, drowned in ice-water, filtered, washed acid-free, and dried. The yield of product is 7.5 parts.

After purification by acid recrystallization, the yellow product is analyzed:

Found:   Cl, 28.0      Calculated            Cl, 31.4
         N, 10.9       for $C_{18}H_6Cl_4N_4O_2$   N, 12.4

The compound thus is concluded to correspond to formula (I) wherein each $n$ is 2. The strong peak at 1655 cm$^{-1}$ in the infrared spectrum of this compound is characteristic of a carbonyl group in a six-membered ring.

The compounds of the Examples are tested for use as pigments in terms of their solubility in refluxing 1-chloronaphthalene, which provides a useful indication of whether the pigments will exhibit adequate bleed resistance when used in wax paper coatings. The compounds of the invention are rated excellent in this regard, meeting or surpassing the solubility characteristics of various commercial yellow pigments.

What is claimed is:

1. A compound of the formula

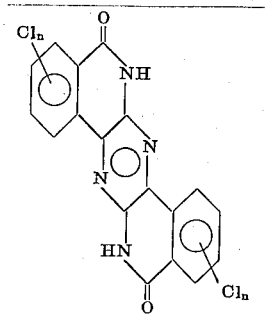

wherein each $n$ is an integer of 0 to 4, inclusive.

2. The compound 5,6,12,13-tetrahydrodiisoquino-(4,3-b:4',3'-e)pyrazine-5,12-dione.

* * * * *